(12) United States Patent
Knighton et al.

(10) Patent No.: US 7,233,351 B1
(45) Date of Patent: Jun. 19, 2007

(54) METHOD FOR HIGH RESOLUTION INCREMENTAL IMAGING

(75) Inventors: Mark S. Knighton, Santa Monica, CA (US); David S. Agabra, Pacific Palisades, CA (US); William D. McKinley, Marina Del Rey, CA (US)

(73) Assignee: NextEngine, Inc., Santa Monica, CA (US)

( * ) Notice: Subject to any disclaimer, the term of this patent is extended or adjusted under 35 U.S.C. 154(b) by 1068 days.

(21) Appl. No.: 09/792,753

(22) Filed: Feb. 23, 2001

(51) Int. Cl.
*H04N 5/262* (2006.01)
(52) U.S. Cl. ....................................... 348/239
(58) Field of Classification Search ............... 348/142, 348/36, 37, 239
See application file for complete search history.

(56) References Cited

U.S. PATENT DOCUMENTS

| | | |
|---|---|---|
| 3,636,250 A | 1/1972 | Haeff |
| 4,089,608 A | 5/1978 | Hoadley |
| 4,404,594 A | 9/1983 | Hannan |
| 4,564,295 A | 1/1986 | Halioua |
| 4,590,608 A | 5/1986 | Chen et al. |
| 4,641,972 A | 2/1987 | Halioua et al. |
| 4,657,394 A | 4/1987 | Halioua |
| 4,705,401 A | 11/1987 | Addleman et al. |
| 4,724,525 A | 2/1988 | Purcell et al. |
| 4,737,032 A | 4/1988 | Addleman et al. |
| 4,802,759 A | 2/1989 | Matsumoto et al. |
| 4,846,577 A | 7/1989 | Grindon |
| 5,067,817 A | 11/1991 | Glenn |
| 5,131,844 A | 7/1992 | Marinaccio et al. |
| 5,132,839 A | 7/1992 | Travis |
| 5,135,309 A | 8/1992 | Kuchel et al. |
| 5,148,502 A * | 9/1992 | Tsujiuchi et al. ........... 382/255 |
| 5,175,601 A | 12/1992 | Fitts et al. |
| 5,216,817 A | 6/1993 | Misevich et al. |
| 5,218,427 A | 6/1993 | Koch |
| 5,231,470 A | 7/1993 | Koch |
| 5,282,045 A | 1/1994 | Mimura et al. |
| 5,285,397 A | 2/1994 | Heier et al. |
| 5,289,264 A | 2/1994 | Steinbichler |
| 5,307,292 A | 4/1994 | Brown et al. |
| 5,315,512 A | 5/1994 | Roth |

(Continued)

FOREIGN PATENT DOCUMENTS

DE           4134546 A1    8/1993

(Continued)

OTHER PUBLICATIONS www.pointcloud.com/pages/Home.html, "Point Cloud," 5 pages.

(Continued)

*Primary Examiner*—Tuan Ho
*Assistant Examiner*—Jason Whipkey
(74) *Attorney, Agent, or Firm*—Blakely, Sokoloff, Taylor & Zafman, LLP

(57) ABSTRACT

A method and apparatus to capture a high resolution photograph of a target. A focal zone of a linear image sensing array is displaced across an area containing a target to be photographed. The displacement may be angular or linear with appropriate scaling to yield the end photograph. By changing the focal depth, relief of the target may be fully focused in one or more passes.

6 Claims, 3 Drawing Sheets

U.S. PATENT DOCUMENTS

| | | | |
|---|---|---|---|
| 5,335,317 A | 8/1994 | Yamashita et al. | |
| 5,337,149 A | 8/1994 | Kozah et al. | |
| 5,377,011 A | 12/1994 | Koch | |
| 5,414,647 A | 5/1995 | Ebenstein et al. | |
| 5,432,622 A | 7/1995 | Johnson et al. | |
| 5,453,784 A * | 9/1995 | Krishnan et al. | 348/348 |
| 5,471,303 A | 11/1995 | Ai et al. | |
| 5,531,520 A | 7/1996 | Grimson et al. | |
| 5,559,334 A * | 9/1996 | Gupta et al. | 250/360.1 |
| 5,592,563 A | 1/1997 | Zahavi | |
| 5,611,147 A | 3/1997 | Raab | |
| 5,617,645 A | 4/1997 | Wick et al. | |
| 5,627,771 A | 5/1997 | Makino | |
| 5,636,025 A | 6/1997 | Bieman et al. | |
| 5,646,733 A | 7/1997 | Bieman | |
| 5,659,804 A * | 8/1997 | Keller | 396/20 |
| 5,661,667 A | 8/1997 | Rueb et al. | |
| 5,678,546 A | 10/1997 | Truppe | |
| 5,689,446 A | 11/1997 | Sundman et al. | |
| 5,701,173 A | 12/1997 | Rioux | |
| 5,704,897 A | 1/1998 | Truppe | |
| 5,708,498 A | 1/1998 | Rioux et al. | |
| 5,745,175 A | 4/1998 | Anderson | |
| 5,747,822 A | 5/1998 | Sinclair et al. | |
| 5,748,194 A * | 5/1998 | Chen | 345/427 |
| 5,771,310 A | 6/1998 | Vannah | |
| 5,794,356 A | 8/1998 | Raab | |
| 5,805,289 A | 9/1998 | Corby, Jr. et al. | |
| 5,864,640 A | 1/1999 | Miramonit et al. | |
| 5,870,220 A | 2/1999 | Migdal et al. | |
| 5,880,846 A | 3/1999 | Hasman et al. | |
| 5,907,359 A | 5/1999 | Watanabe | |
| 5,910,845 A | 6/1999 | Brown | |
| 5,944,598 A | 8/1999 | Tong et al. | |
| 5,946,645 A | 8/1999 | Rioux et al. | |
| 5,978,102 A * | 11/1999 | Matsuda | 358/474 |
| 5,988,862 A | 11/1999 | Kacyra et al. | |
| 5,995,650 A | 11/1999 | Migdal et al. | |
| 5,999,641 A | 12/1999 | Miller et al. | |
| 6,016,487 A | 1/2000 | Rioux et al. | |
| 6,037,584 A * | 3/2000 | Johnson et al. | 358/412 |
| 6,057,909 A | 5/2000 | Yahav et al. | |
| 6,078,701 A * | 6/2000 | Hsu et al. | 382/294 |
| 6,091,905 A | 7/2000 | Yahav et al. | |
| 6,100,517 A | 8/2000 | Yahav et al. | |
| 6,111,582 A * | 8/2000 | Jenkins | 345/427 |
| 6,115,146 A * | 9/2000 | Suzuki et al. | 358/474 |
| 6,137,896 A | 10/2000 | Chang et al. | |
| 6,157,747 A * | 12/2000 | Szeliski et al. | 348/36 |
| 6,192,393 B1 * | 2/2001 | Tarantino et al. | 345/427 |
| 6,233,014 B1 * | 5/2001 | Ochi et al. | 348/324 |
| 6,535,250 B1 * | 3/2003 | Okisu et al. | 348/345 |
| 6,721,465 B1 * | 4/2004 | Nakashima et al. | 382/318 |
| 7,058,213 B2 * | 6/2006 | Rubbert et al. | 348/207.99 |
| 7,068,836 B1 * | 6/2006 | Rubbert et al. | 348/66 |

FOREIGN PATENT DOCUMENTS

WO     WO 01/09836 A1     2/2001

OTHER PUBLICATIONS www.inharmonytech.com/venus3d.index.html, "Introducing Venus 3D," 4 pages.

deskeng.com/3dd.htm, "Desktop Engineering, The Complete Computing Resource for Engineers," 1977 Helmers Publishing, Inc., 1 page.

www.geometrixinc.com/mainwin.html, "Who says you can't build Rome in a day?", 4 pages.

* cited by examiner

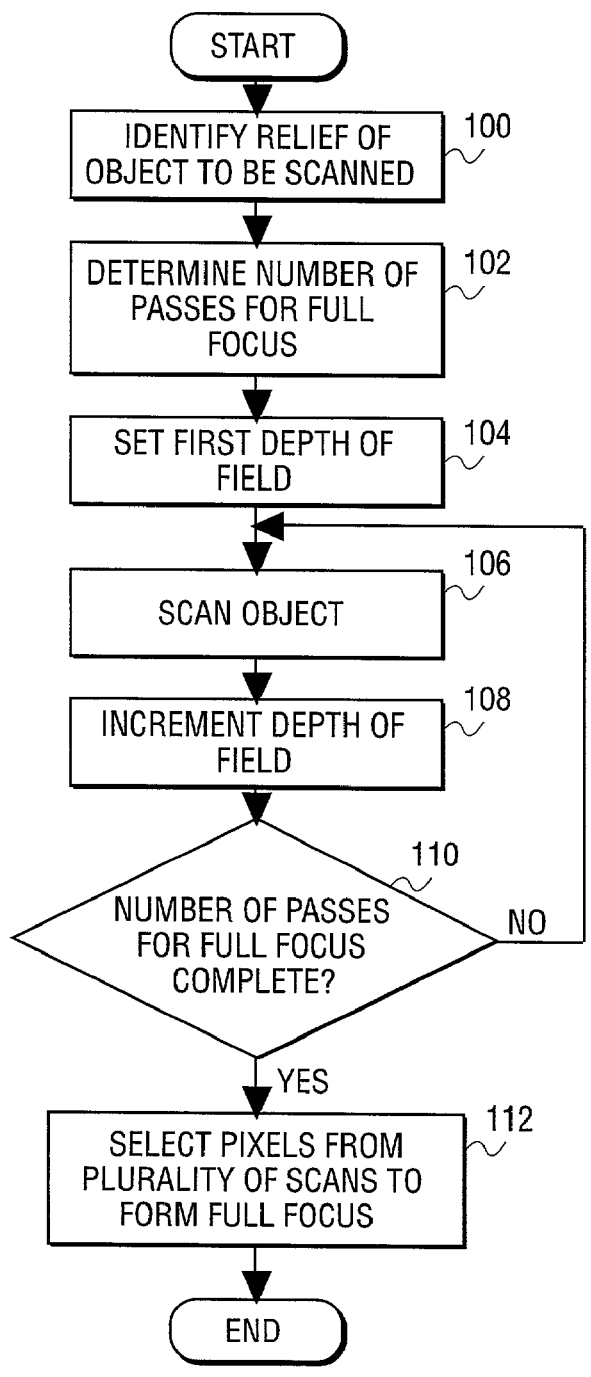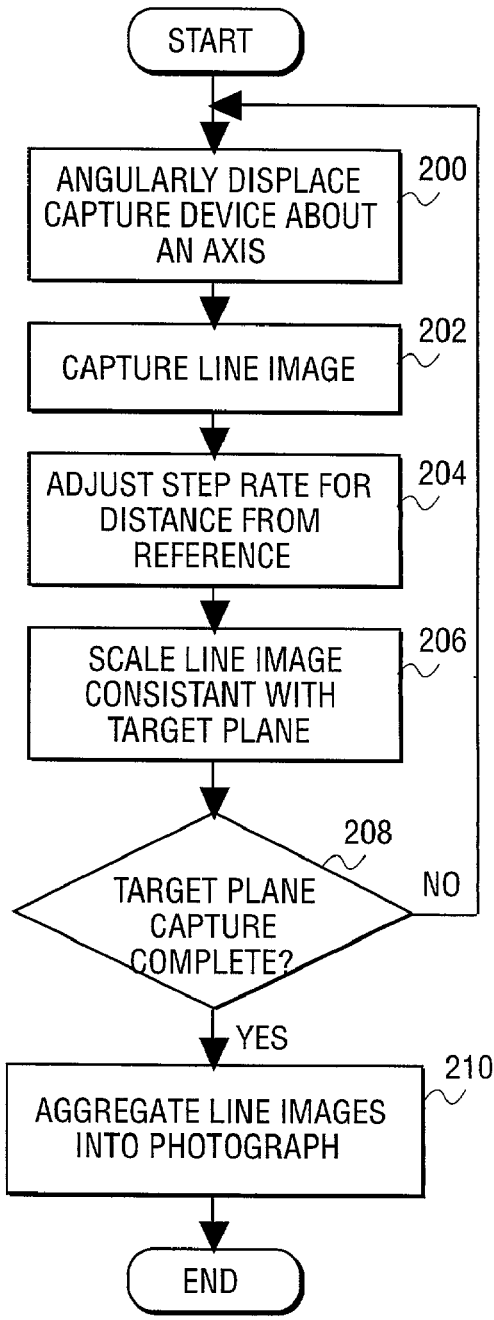
FIG. 2
FIG. 3

METHOD FOR HIGH RESOLUTION INCREMENTAL IMAGING

BACKGROUND

1. Field of the Invention

The invention relates to high resolution photography. More specifically, the invention relates to capturing a photographic image using an angularly displaced image sensing array.

2. Background

Standard photography has existed for decades. A lens or series of lenses focuses light onto a light-sensitive emulsion when a shutter opens. The lens is focused on a plane at some distance from the camera and captures in acceptable focus those things in that plane and some distance in either direction from the plane. That area in which an acceptably focused image may be captured is the depth of field. The depth of field dictates the focus of more distant features of the object photographed as well as its surroundings. A standard photograph is a planar representation of a focal plane from the perspective of the camera.

Various techniques for capturing digital images have proliferated. Digital photography is becoming increasingly mainstream. Relatively high resolution pictures may be captured using existing megapixel cameras which are widely commercially available. One advantage of digital images is the ability to manipulate them on computer. In particular, the ability to zoom in to see fine detail in the image. The general depth of field of existing digital cameras, as well as the resolution, causes the image to break down relatively rapidly on successive zooms.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 2 is a flow diagram of capturing a full focus image in one embodiment of the invention.

FIG. 3 is a flow diagram of scanning an object of one embodiment of the invention.

DETAILED DESCRIPTION

Figure 1:
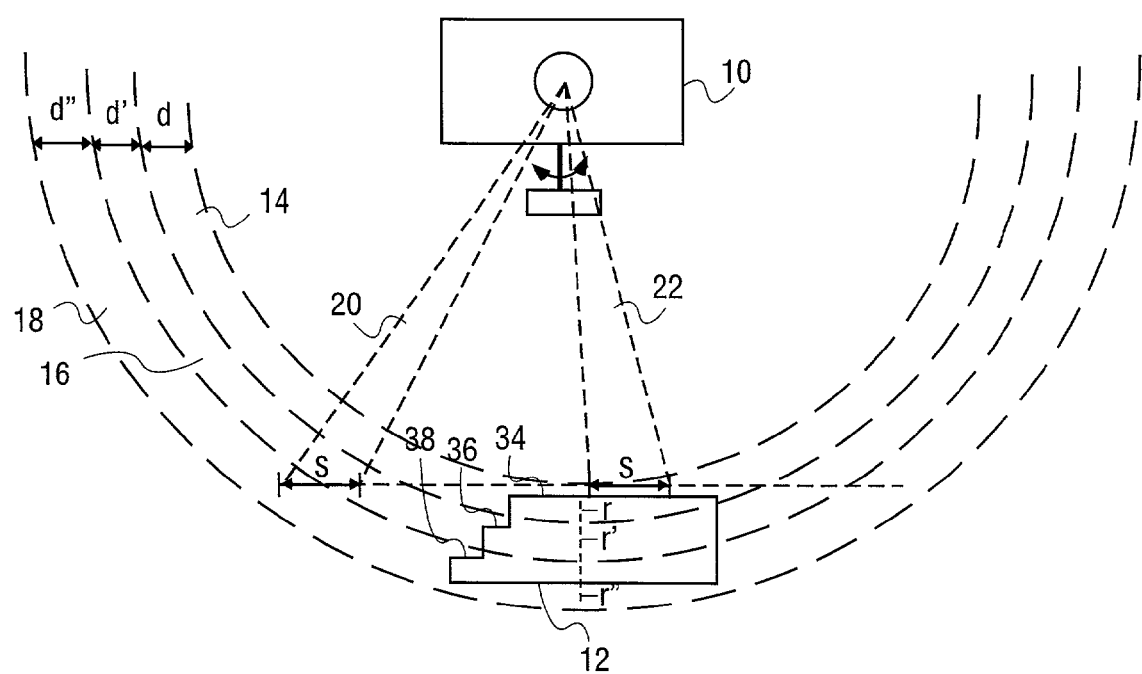
FIG. 1 is a schematic diagram of a full focus capture system of one embodiment of the invention.

FIG. 1 is a schematic diagram of a full focus capture system of one embodiment of the invention. A capture device 10 is angularly displaced about an axis. By sweeping some element in the optical path through an arc, a focal zone of an image sensor moves across a target and image data is captured. As used herein, a "focal zone" is deemed to be the view of the sensing element of a capture device during a capture period. In one embodiment, capture device 10 uses a linear image sensing array (LISA) to capture lines of data to be assembled into a photograph. Capture device 10 may be of the type described in copending application Ser. No. 09/660,809 entitled DIGITIZER USING INTENSITY GRADIENT TO IMAGE FEATURES OF THREE-DIMENSIONAL OBJECTS, now U.S. Pat. No. 6,639,684. Such a capture device enables the system to directly derive three-dimensional information about the object. Such three-dimensional data may be used to generate a full focus photograph as described below. It is, however, not essential to the instant invention that the capture device be able to derive three-dimensional information about the target object.

The optics of capture device 10 are assumed to have a depth of field "d" at a given distance. Depth of field tends to increase with distance from the capture device. As previously indicated, depth of field is the range of distance over which the acceptable focus can be achieved without varying the lens arrangement. As used herein, depth refers to distance from a reference to a point on the surface of the target (rather than, for example, thickness of the material of the target itself). For one embodiment, acceptable focus is defined to be where the defocusing blur is less than one pixel width. A target 12 which has a surface relief greater than d cannot be fully focused in a single pass. As used herein, a target may be one or more objects or an environment. Accordingly, the capture device 10 establishes a first focal distance r to, for example, bring the leading edge 34 of a target into focus. Given the depth of field d, all points within zone 14 are in focus during a first pass. However, portions of the target 12 outside of zone 14, such as surface 36 and surface 38, will be out of focus. On subsequent passes the focal distances r' and r" are established to bring zones 16 and 18 into focus and thereby achieve focus of surfaces 36 and 38. After three passes, three images of target object 12 have been captured. Those images may then be composited either within the capture device or on a host (not shown), such that only those points within the photograph that are in the best focus of the three images are selected for the composite picture. In some embodiments, the images may be used to create a composite texture map for a three-dimensional model of the target. Accordingly, as used herein, "image" may include all or a portion of a texture map. In one embodiment, the best focus may be determined by processing the image in the frequency domain. Sharpness of feature edges is greater and therefore focus is greater where the rate of change of data between adjacent pixels is the greatest. This is reflected as peaks in the frequency domain. In alternate embodiments, three dimensional data about the object may be used to select pixels from the various images captured. In either case, a full focus of surfaces 34, 36 and 38 can be achieved in the composite photograph. While three passes are described, the disclosed techniques may be generalized to N passes where N is an arbitrarily large number.

Because the capture device operates based on angular displacement, a planar assumption must be imposed to yield a standard photograph. Those points off the perpendicular from the capture device 10 to the target 12 will need to be scaled to compensate for the greater distance. Additionally, the angular displacement will be shorter at the edges of the arc and longer closer to the perpendicular in view of the fact that it is desirable to have the same linear displacement S between respective captures regardless of where on the plane the capture is to occur. As shown, the angular displacement between the two captures defining area 20 is less than the angular displacement between the two captures defining area 22, while the linear displacement between the two captures on the photo plane remains S.

It is within the scope and contemplation of the invention to adjust the angular velocity while maintaining a constant capture rate or adjust the capture rate while maintaining a constant angular velocity to effect the consistent linear displacement between captures. It is also within the scope and contemplation of the invention to dynamically change the angular displacement between captures during scanning based on data capture or known characteristics of the target. For example, for target 12 the importance of close displacements between captures on surface 34 at the focal distance for zone 36 is negligible assuming the surface is homogeneous.

In another embodiment of the invention, the capture device 10 automatically changes the focal distance between displacements to compensate for distance from a reference position. For example, the focal distance for the captures defining area 20 would be longer than the focal distances defining area 22. In this manner, the capture 10 device may impose a focal plane on the image where without the capture device 10 this changing focal distance would typically have a focal cylinder resulting from the angular displacements. The plane need not be imposed perpendicular to the capture device 10 and other capture patterns such as to more closely match a surface relief of the target 12 are within the scope and contemplation of the invention.

In one embodiment, before beginning actual image capture, the image capture device 10 performs a rough scan to discern the number of passes of capture required to achieve a full focus end photograph. In another embodiment, the capture device 10 begins capturing at a preestablished focal distance and iteratively captures subsequent depths of field until a prescribed number of passes have occurred. In still another embodiment, the system infers from data captured and dynamically determines what additional depths should be captured.

In one embodiment, the capture device 10 captures a texture map of a facing surface the target 12 through one or more passes. As used herein, "facing surface" is deemed to mean the surface of the target object visible from the point of view of the capture device assuming an infinite field of view. In some embodiments, the target object may be repositioned relative to the capture device by, for example, a turntable. In one embodiment, the capture occurs while the object is illuminated by non-coherent broad spectrum illumination, such that no laser is required for the capture.

FIG. 2 is a flow diagram of capturing a full focus image. Generally speaking a target to be photographed has some relief, i.e., depth characteristics. Except for the limiting case where the object is arcuate, it is relatively likely that the relief will be greater than the depth of field of any static imaging device. Thus, an image captured with any particular focal point on the object in focus will necessarily result in other points being out of focus. Accordingly, in one embodiment of the invention, the relief of the object to be scanned is identified at functional block 100. Then at functional block 102 a determination of the number of passes desired or to be used to create a full focus image is determined. By way of example, if the depth of field of the lens assembly in use is 1", three passes would be required to achieve a full focus image of an object having a 2.5" relief. At functional block 104 a capture device is set to have a first depth of field. At functional block 106 the object is scanned at the first depth of field. At functional block 108 the depth of field is incremented. At decision block 110 a determination is made if the number of passes for a full focus is complete. If it is not, the object is rescanned and further incrementation of the depth of field occurs. When the number of passes for full focus is complete, pixels are selected from a plurality of scans to form a full focus image at functional block 112. Selection of the pixel at functional block 112 may be accomplished as the result of knowledge about three-dimensional characteristics of the target object, or may be inferred by looking at the pixels from each respective image and comparing the relative focus of the pixels in the different images corresponding to the same region.

FIG. 3 is a flow diagram of scanning an object of one embodiment of the invention. At functional block 200 an image capture device is angularly displaced about an axis. At functional block 202 a line image is captured corresponding to the current orientation of the capture device. At functional block 204 the displacement between captures is adjusted for a distance from the reference position. At functional block 206 the line image is scaled consistent with a target plane. At functional block 208 a determination is made if capture of the target plane is complete. If it is not, the capture device is again angularly displaced based on the adjusted displacement rate, and further line captures occur consistent with functional blocks 200–206. If capture of the target plane is complete the line images are aggregated into a photograph at functional block 210.

Figure 4:
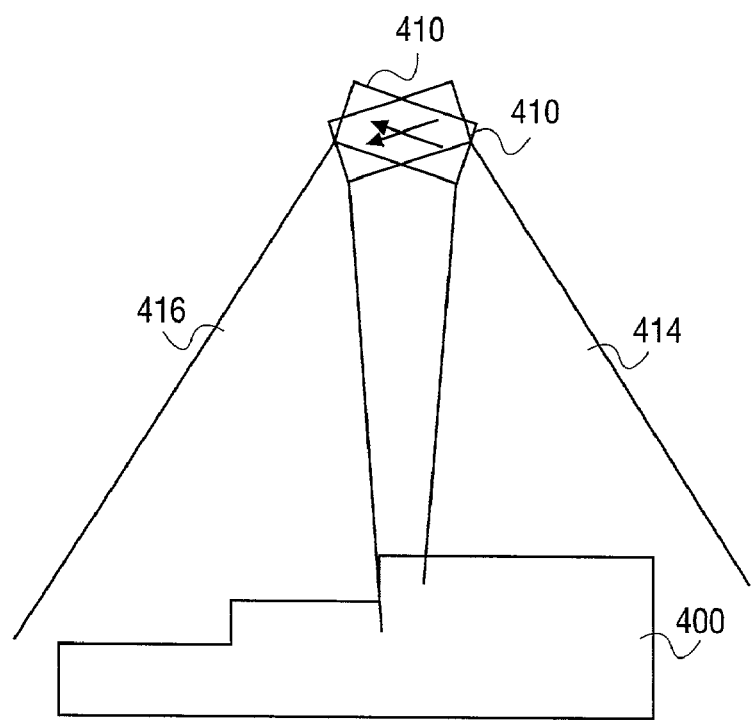
FIG. 4 is a schematic diagram of a system of one embodiment of the invention.

FIG. 4 is a schematic diagram of a system of one embodiment of the invention. The capture device 410 captures the image of a target 400 that resides within the field of view 414. The image is captured by successive displacements of a focal zone of a linear image sensor within capture device 410. In one embodiment, the linear image sensor is displaced linearly across an aperture to capture a full frame with successive linear captures. Because the field of view is insufficiently wide to capture a desired photograph of target 400 after the first image is captured, the image capture device 410 is automatically repositioned to change its field of view to be field of view 416. The subsequent image may be captured through the linear displacements of the focal zone of the capture device 410. Showing example field of views 414 and 416 overlap so that a portion of the target 400 is redundantly captured. It is within the scope and contemplation of the invention to reduce or increase the amount of such overlap, though some overlap is desirable to ensure data is not lost at the margin. The two images captured may be processed to append them together to form a single photograph of the entire target 400. It is also within the scope and contemplation of the invention that the repositioning may be linear rather than angular. For example, the capture device 410 could translate along a guide rod (not shown) to take successive pictures along a plane parallel to the guide rod.

Figure 5:
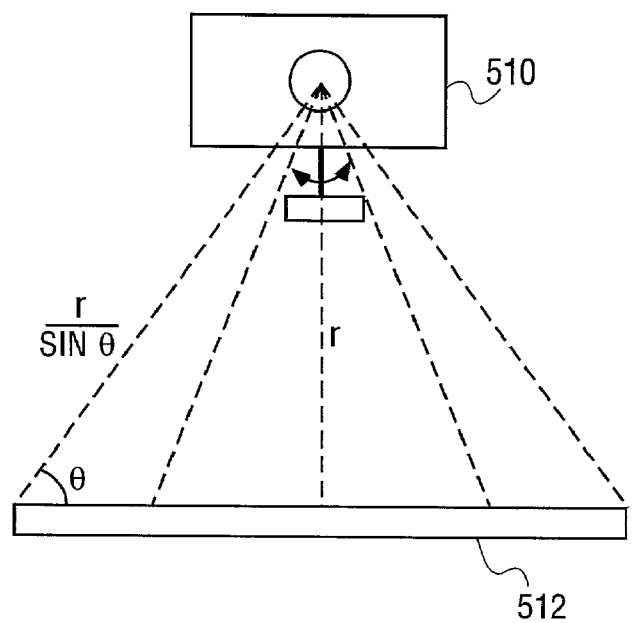
FIG. 5 is a schematic diagram of an alternative embodiment of the invention.

FIG. 5 is schematic diagram of an alternative embodiment invention. In this embodiment, capture device 510 adjusts the focus of its lens assembly as it moves through a series of angular displacements. This effectively creates a planar focal zone consistent with target object 512. If r is the perpendicular distance from the capture device to the desired focal point, the focal distance for the other displacements is given by $r/\sin \theta$. By appropriately adjusting the focal distance, a high resolution image of a planar surface can be captured. In one embodiment, analogous focus adjustment is used to appropriately adjust the focal distance where three-dimensional depth data for the object in conjunction with the appropriate trigonometric relationship is used to establish the focal distance.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:

acquiring depth data about a target;

determining from the depth data a number of images at an available depth of field required to achieve acceptable focus of the target;

capturing images of the target at successive depths until the number of images has been captured; and combining data from the images to form a composite image which has a greater percentage of total area at an acceptable focus than any single image.

2. The method of claim 1 wherein combining comprises:

analyzing corresponding regions of pixels from the images captured at the number of depths; and selecting pixels from the corresponding region having a greatest clarity to be a pixel of the composite image.

3. The method of claim 1 wherein combining comprises:

identifying from the depth data, regions likely to have acceptable focus in an image captured at a particular depth; and assembling pixels from the identified regions to form the composite image.

4. The method of claim 1 wherein acquiring comprises:

conducting an initial scan of the target to capture depth data.

5. The method of claim 1 wherein capturing is performed using a linear image sensing array.

6. A method comprising:

acquiring depth data about a target including accessing a data file containing information about the target;

determining from the depth data a number of images at an available depth of field required to achieve acceptable focus of the target;

capturing images of the target at successive depths until the number of images has been captured; and combining data from the images to form a composite image which as a greater percentage of total area at an acceptable focus than any single image.

* * * * *